US010392125B2

(12) United States Patent
Shams

(10) Patent No.: US 10,392,125 B2
(45) Date of Patent: Aug. 27, 2019

(54) SYSTEM AND METHOD FOR ONBOARD WAKE AND CLEAR AIR TURBULENCE AVOIDANCE

(71) Applicant: U.S.A, as represented by the Administrator of the National Aeronautics and Space Administration, Washington, DC (US)

(72) Inventor: Qamar A. Shams, Hampton, VA (US)

(73) Assignee: UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 0 days.

(21) Appl. No.: 15/601,075

(22) Filed: May 22, 2017

(65) Prior Publication Data

US 2017/0334576 A1 Nov. 23, 2017

Related U.S. Application Data

(60) Provisional application No. 62/340,020, filed on May 23, 2016.

(51) Int. Cl.
*G08G 5/00* (2006.01)
*B64D 43/00* (2006.01)
*B64D 45/00* (2006.01)

(52) U.S. Cl.
CPC ............. *B64D 45/00* (2013.01); *B64D 43/00* (2013.01); *G08G 5/0039* (2013.01); *G08G 5/0021* (2013.01); *G08G 5/0091* (2013.01)

(58) Field of Classification Search
None
See application file for complete search history.

(56) References Cited

U.S. PATENT DOCUMENTS

| | | | | |
|---|---|---|---|---|
| 7,962,252 | B2 | 6/2011 | Shams et al. | |
| 8,401,217 | B2 | 3/2013 | Shams et al. | |
| 8,671,763 | B2 | 3/2014 | Zuckerwar et al. | |
| 9,620,025 | B2 * | 4/2017 | Shams | G08G 5/0021 |
| 9,949,025 | B2 * | 4/2018 | Frazier | H04R 1/406 |
| 2007/0104026 | A1 * | 5/2007 | Rubin | G01W 1/10 367/13 |
| 2009/0022341 | A1 * | 1/2009 | Shams | G01H 11/02 381/174 |
| 2011/0219869 | A1 * | 9/2011 | Asahara | G01P 5/26 73/181 |
| 2015/0049589 | A1 * | 2/2015 | Dooley | G01L 19/00 367/137 |

(Continued)

*Primary Examiner* — Nicholas K Wiltey
(74) *Attorney, Agent, or Firm* — Andrea Z. Warmbier; Robin W. Edwards; Mark P. Dvorscak

(57) ABSTRACT

Systems and methods are disclosed for passively detecting air turbulence using one or more infrasonic sensors mounted on an aircraft. The system may include one or more infrasonic sensors that are mounted on the aircraft and configured to detect infrasound. The system may also include a processor configured to receive output signals from the one or more infrasonic sensors and detect air turbulence away from the aircraft based on the output signals received from the one or more infrasonic sensors. The detected air turbulence may include natural or man-made turbulence including wake turbulence, clear air turbulence, mountain waves, or events such as a rocket launch.

18 Claims, 11 Drawing Sheets

(56) References Cited

U.S. PATENT DOCUMENTS

| | | | | |
|---|---|---|---|---|
| 2015/0241267 | A1* | 8/2015 | Bousquet ................. | G01H 3/10 381/91 |
| 2015/0339930 | A1* | 11/2015 | McCann .............. | G08G 5/0039 701/528 |
| 2016/0090194 | A1* | 3/2016 | O'Dell .................... | B64C 13/04 701/3 |

* cited by examiner

800

SYSTEM AND METHOD FOR ONBOARD WAKE AND CLEAR AIR TURBULENCE AVOIDANCE

CROSS-REFERENCE TO RELATED PATENT APPLICATION(S)

This patent application claims the benefit of and priority to U.S. Provisional Patent Application No. 62/340,020, filed on May 23, 2016, the contents of which are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposed without the payment of any royalties thereon or therefore.

BACKGROUND OF THE INVENTION

Clear air turbulence (also referred to as "CAT") is a leading cause of in-flight injuries and in severe cases can result in fatalities, resulting in significant losses in annual revenue to the aviation industry. Clear air turbulence is a turbulent movement of air masses in the absence of any visual clues (e.g., clouds). Clear air turbulence may be caused when bodies of air moving at widely different speeds meet and is frequently encountered by aircraft in the regions of jet streams. Clear air turbulence is usually impossible to detect with the naked eye and very difficult to detect with conventional radar, making it difficult for aircraft pilots to detect and avoid clear air turbulence.

Wake turbulence is another type of air turbulence that forms behind an aircraft as it passes through the air. Wake turbulence may include wake vortices that occur when a wing is generating lift. Air from below the wing is drawn around the wingtip into a region above the wing by the lower pressure above the wing, causing a wake vortex to trail from each wingtip. Wake turbulence is especially hazardous in the region behind an aircraft in the takeoff or landing phases of flight. To avoid wake vortices, the Federal Aviation Administration (FAA) has issued fixed aircraft separation standards for takeoff, approach, and landing. These aircraft separation standards result in delays that limit the volume of takeoffs and landings at airports, again resulting in significant losses in annual revenue to the aviation industry.

Existing systems for detecting wake and clear air turbulence are typically based on electromagnetic techniques, such as radar or LIDAR for example. However, such systems generally suffer a number of disadvantages including weight, power consumption, limited range, safety issues, and other considerations. For example, LIDAR based systems may detect wake and/or clear air turbulence from optically-generated digital representations of aerosols (e.g., water droplets) or aerial density fluctuations at flight altitudes. However, aerosols may not always be available in sufficient concentration and effective reflections from density fluctuations require significant amounts of power.

BRIEF SUMMARY OF THE INVENTION

Various embodiments provide systems and methods for passively detecting air turbulence using one or more infrasonic sensors mounted on an aircraft. The system may include one or more infrasonic sensors that are mounted on the aircraft and configured to detect infrasound. The system may also include a processor configured to receive output signals from the one or more infrasonic sensors and detect air turbulence away from the aircraft based on the output signals received from the one or more infrasonic sensors. The detected air turbulence may include natural or man-made turbulence, including but not limited to wake turbulence, clear air turbulence, mountain waves, and severe weather including tornadoes; or events such as a rocket launch, etc. Various embodiments may provide an onboard air turbulence avoidance system for an aircraft, including one or more infrasonic sensors mounted on the aircraft and configured to passively detect infrasound, the system configured to receive output signals from the one or more infrasonic sensors and detect air turbulence away from the aircraft based on the output signals received from the one or more infrasonic sensors.

These and other features, advantages, and objects of the present invention will be further understood and appreciated by those skilled in the art by reference to the following specification, claims, and appended drawings.

DETAILED DESCRIPTION OF THE INVENTION

Figure 1A:
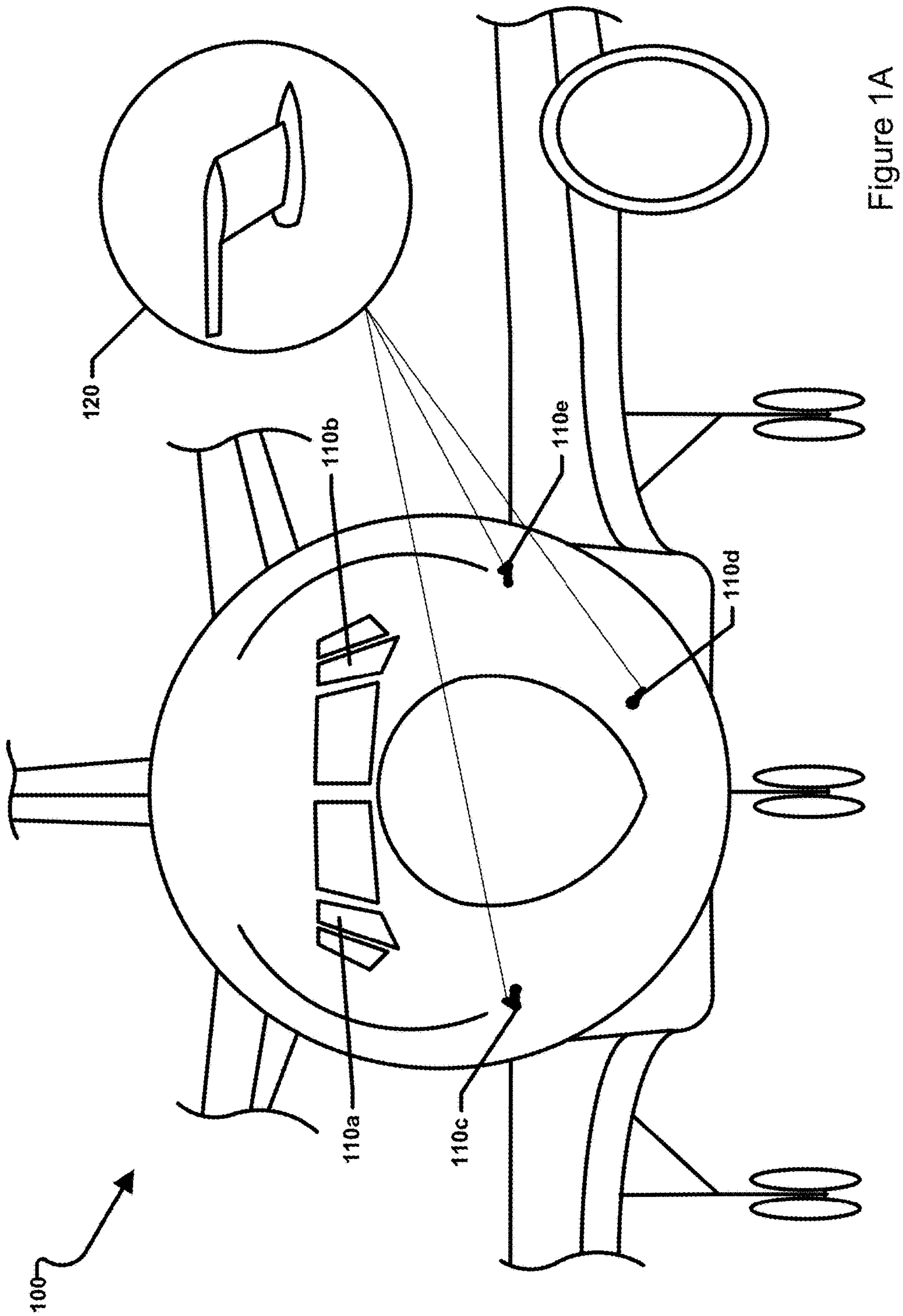
FIGS. 1A and 1B are diagrams illustrating infrasonic sensors mounted at various locations of an aircraft for detecting air turbulence according to some embodiments.

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "aircraft" refers to one of various types of vehicles capable of flight, including but not limited to airplanes, helicopters, unmanned aerial vehicles ("UAV" or drones), and gliders, for example.

The term "computing device" is used herein to refer to an electronic device equipped with at least a processor. Examples of computing devices may include a data acquisition computer system onboard an aircraft, as well as remote computing devices communicating with the aircraft, configured to perform operations of the various embodiments. Remote computing devices may include wireless communication devices (e.g., cellular telephones, wearable devices, smart-phones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

Wake and clear air turbulence are strong emitters of infrasound. A property of infrasound is that it propagates over long distances with little attenuation. Various embodiments are disclosed herein of an onboard aircraft turbulence avoidance system that leverages the propagation properties of infrasound by passively detecting and tracking air turbulence at remote distances using one or more infrasonic sensors mounted to an aircraft. The sensors may be configured to detect pressure fluctuations associated with infrasound generated by wake and clear air turbulence. The sensors may output time-varying signals representative of such infrasonic pressure fluctuations associated with the turbulence. In some embodiments, a processor of the onboard passive system for aircraft turbulence avoidance may detect the air turbulence away from the aircraft based on the signals output from the sensors. In some embodiments, the processor may also determine a direction and distance of the detected air turbulence relative to the aircraft. In some embodiments, the processor may further provide early warning signals of the detected air turbulence to pilots and/or automated navigation systems. For example, the processor may transmit a signal to trigger a computerized pilot warning system, thereby enabling a pilot of the aircraft to take steps to evade or ameliorate the impending turbulence. In some embodiments, the processor may transmit a signal to trigger an automated navigation system to generate an updated flight plan such that the aircraft may be re-routed to avoid the detected air turbulence. In some embodiments, advanced detection of wake turbulence in or about an airport may enable a pilot to dynamically determinate a safe separation distance from other aircraft during takeoff, approach, and/or landing. In some embodiments, advanced detection of clear air turbulence may enable a pilot or an automated navigation system to re-route the aircraft to avoid such turbulence in flight at cruising altitudes.

Figure 1B:
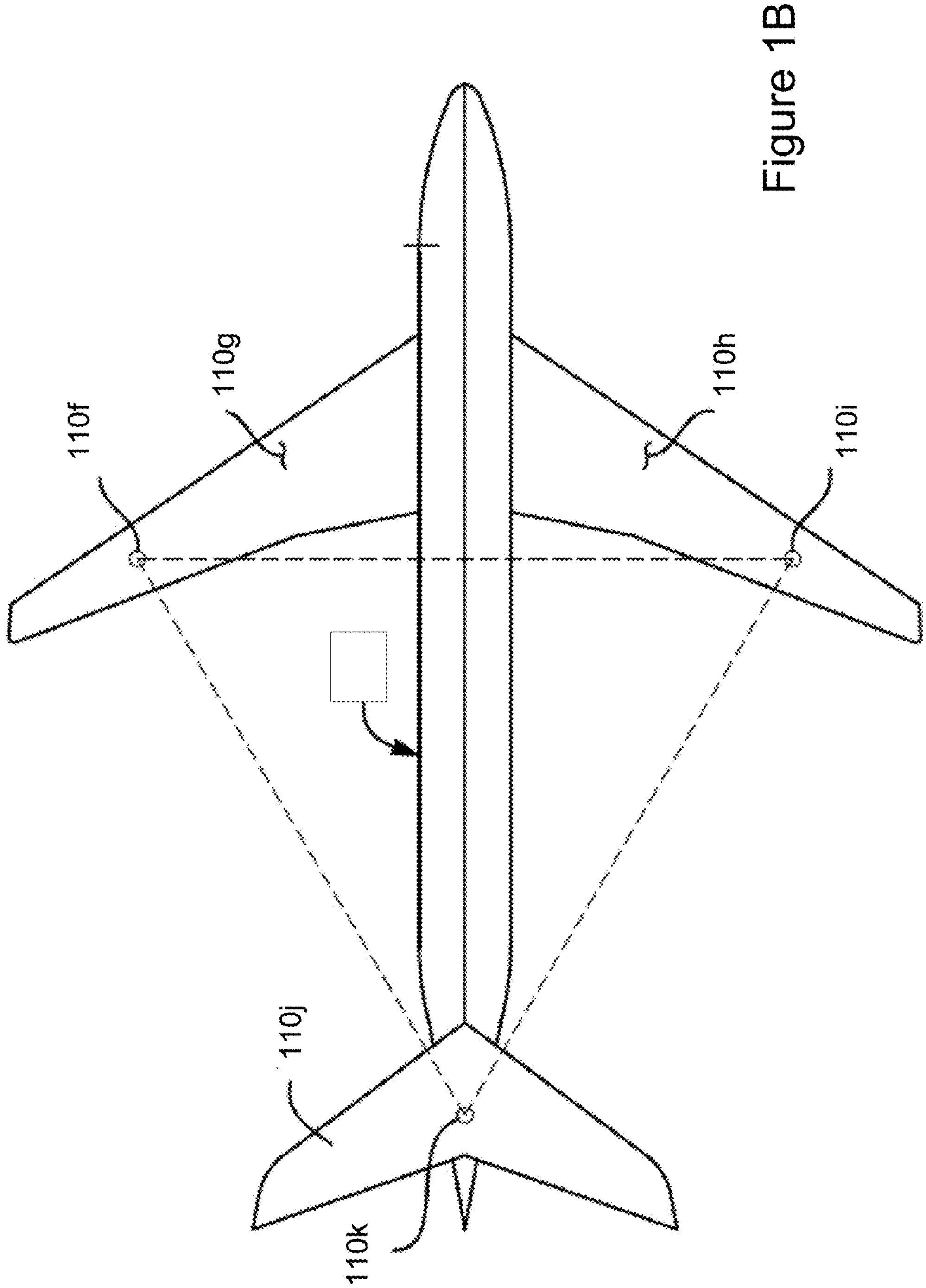

FIGS. 1A and 1B are diagrams illustrating infrasonic sensors mounted at various locations of an aircraft for detecting air turbulence according to some embodiments. Although the aircraft 100 is illustrated as an airplane, some embodiments may include other types of aircraft, including helicopters, UAVs, drones, and gliders for example. The infrasonic sensors may include infrasonic microphones configured to detect inaudible, low frequency sounds (or pressure fluctuations) associated with wake turbulence, clear air turbulence, mountain waves, severe weather including tornadoes, and/or man-made turbulence events, such as a rocket launch. For example, in some embodiments, an aircraft may be equipped with infrasonic sensors coupled to an onboard passive system for detecting and monitoring wake vortices shed from a leading aircraft in real time. In some embodiment, the onboard passive system may be configured to warn pilots and/or flight crew working in a terminal flight area in response to detecting wake vortices.

In some embodiments, one or more infrasonic sensors may be mounted to an interior of the aircraft. For example, as shown in FIG. 1A, one or more infrasonic sensors may be mounted at interior locations inside the cockpit (e.g., 110*a* and 110*b*) of the aircraft 100. For example, in some embodiments, the infrasonic sensors may be mounted to a support frame inside the cockpit, such as a support frame of an instrument panel. In some embodiments, the infrasonic sensors may be arranged inside the cockpit to face towards one or more windows of the aircraft 100 in the direction that the aircraft is heading.

In some embodiments, one or more infrasonic sensors may be mounted at various locations on an external surface or to an external port (e.g., pitot tube) of the aircraft. As shown in FIG. 1A, in some embodiments, infrasonic sensors may be mounted on an external surface or port towards the nose of the aircraft, such as locations 110*c*, 110*d*, 110*e* for example. As shown in FIG. 1B, in some embodiments, infrasonic sensors may be mounted on an external surface or port along the wing, tail, or other external surface, such as locations 110*f*, 110*g*, 110*h*, 110*i*, 110*j*, and 110*k*, for example. In some embodiments, an infrasonic sensor may be mounted to an external port, such as pitot tube 120. A pitot tube 120, which is typically used to measure the airspeed of an aircraft, may be attached to or otherwise extend from an external surface of the aircraft.

Figure 2A:
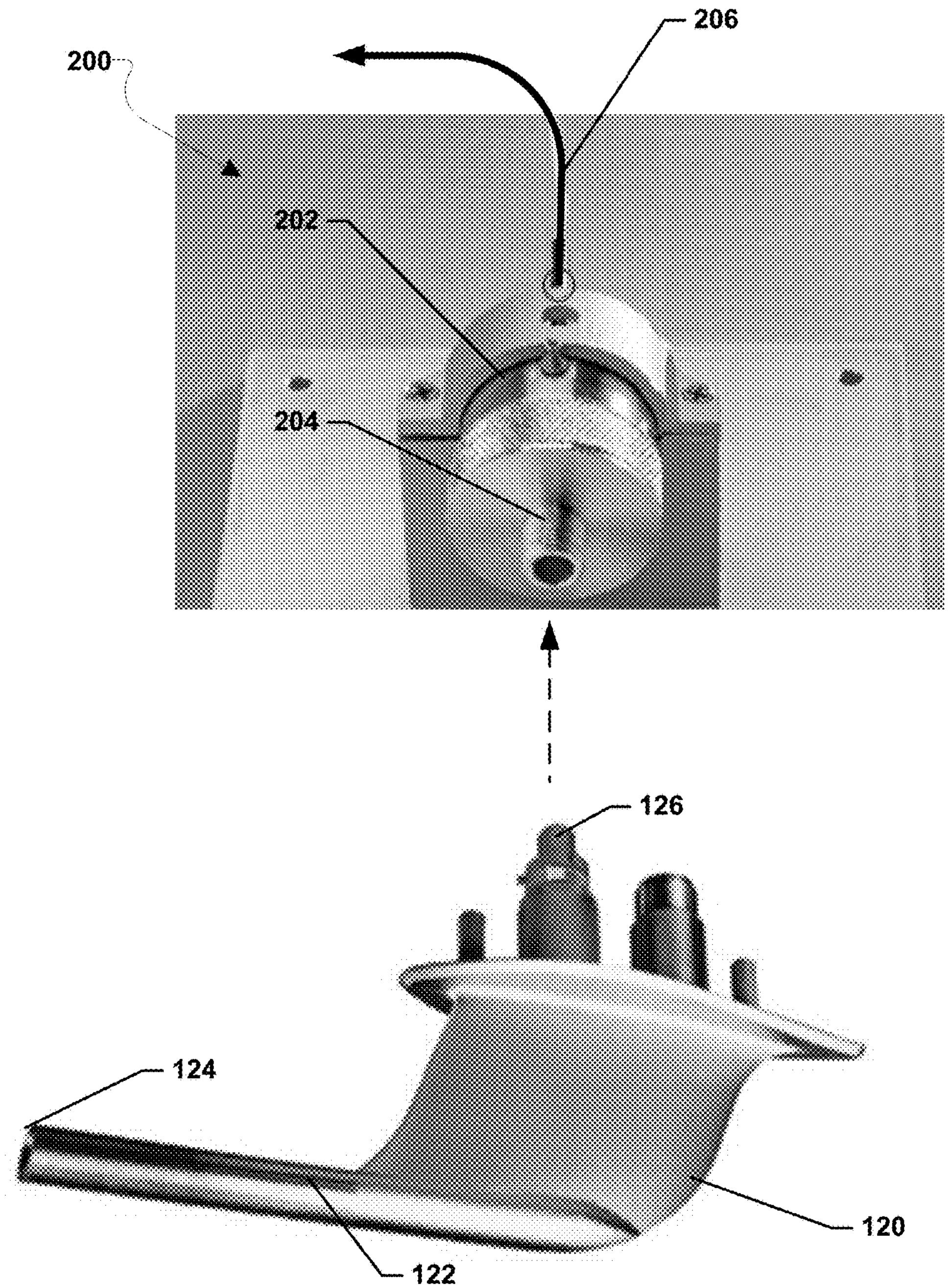
FIGS. 2A and 2B are diagrams illustrating an infrasonic sensor configured for mounting to a pitot tube of an aircraft according to some embodiments.
Figure 2B:
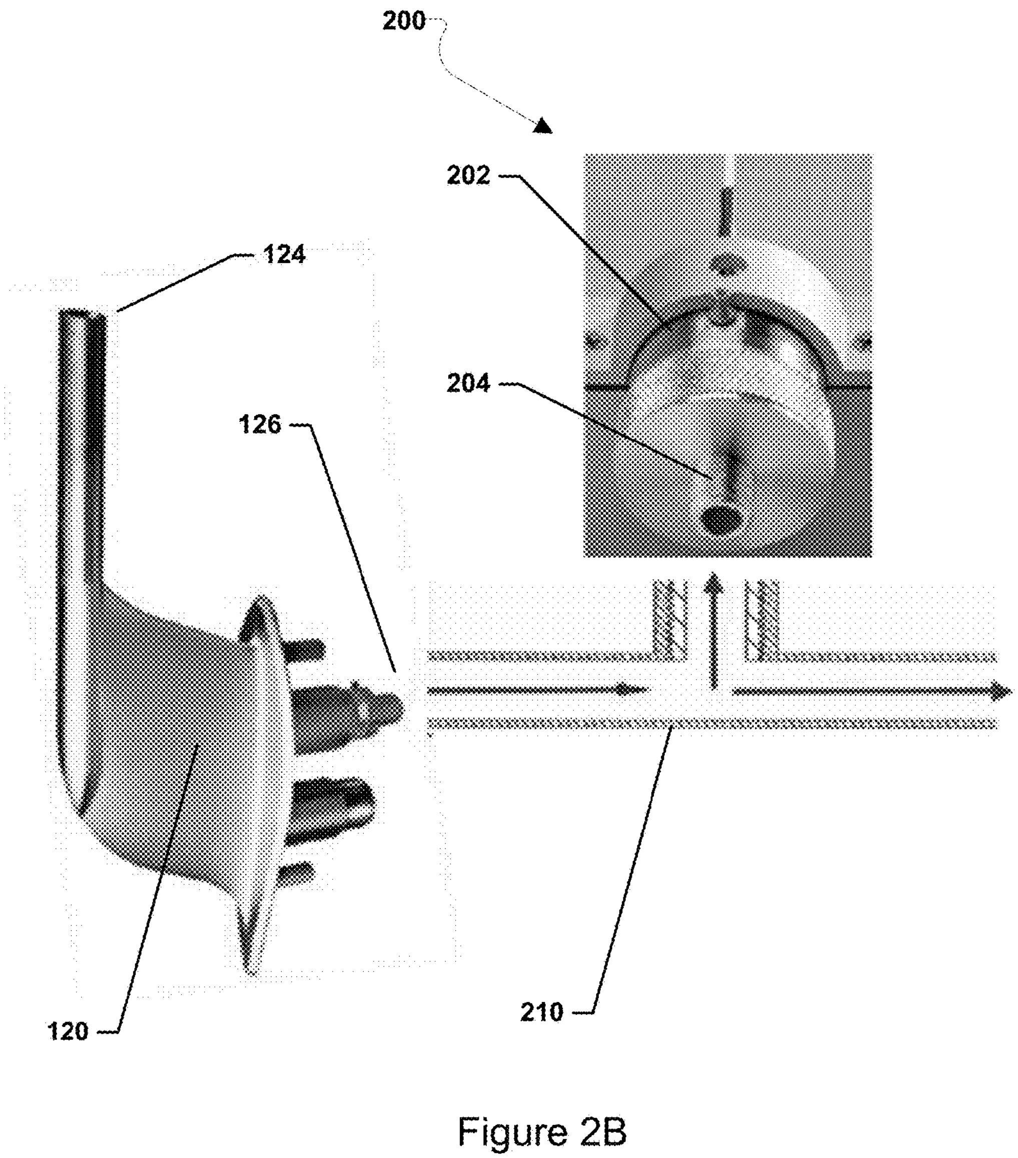

FIGS. 2A and 2B are diagrams illustrating an infrasonic sensor 200 configured for mounting to a pitot tube 120 of an aircraft according to some embodiments. As shown in FIG. 2A for example, in some embodiments, in the infrasonic sensor 200 may include a sensor body or housing 202 and an input coupling 204 defined at one end of the sensor body 202. The input coupling 204 may be configured to mate with an output coupling 126 of the pitot tube 120. In some embodiments, the input coupling 204 may have a threaded structure or other mating structure for connecting to the output coupling 126 of the pitot tube 120. In some embodiments, the infrasonic sensor 200 may have a relatively small form factor, e.g., about 1.5 to 3 inches in length.

In some embodiments, the pitot tube 120 may include a hollow tube portion 122 that extends from an external surface of the aircraft 100. An opening 124 may be defined at one end of the tube 122 pointing in the direction of air flow. As air flows into the opening of the pitot tube 120, a portion of the air flow may be directed internally through the output coupling 126 of the pitot tube and into the input coupling 204 into the sensor body 202.

In some embodiments, the sensor body 202 may contain sensor components (not shown) that are configured to passively detect pressure fluctuations associated with the infrasound received from the pitot tube 120. For example, the sensor components may be configured to detect pressure fluctuations produced by wake vortices in the range of 0.1 to 100 Hz and/or pressure fluctuations produced by clear air turbulence in the range of 0.1 to 10 Hz. Embodiments of the infrasonic sensor 200 may configured to detect the infrasound associated with wake turbulence, clear air turbulence, or both as described in U.S. Pat. No. 8,401,217, the entire contents of which are incorporated herein by reference.

As shown in FIG. 2B, in some embodiments, the infrasonic sensor 200 may be installed at the pitot tube 120 or other new port using an air pipe 210, such as a T-shaped (or perpendicularly disposed) air pipe 210. In some embodiments, when using an existing pitot tube, the air pipe 210 may be adapted to fit the existing pitot tube 120 and the infrasonic sensor 200 may be adapted to fit the pipe 210. For example, in some embodiments, wherein the air pipe 210 has a T-shaped structure, the infrasonic sensor 200 may be fitted to the air pipe 210 at a right angle. Thus, by fitting the input coupling 204 of the sensor 120 and the output coupling 126 of the pitot tube 120 to the air pipe 210, air flow may propagate from the output coupling 126 through the air pipe 210 into the input coupling 204 of sensor 120.

In some embodiments, the infrasonic sensor 200 may output time-varying signals representative of infrasound propagating through the air to a computing device that implements data acquisition and air turbulence detection. For example, in some embodiments, the sensor 200 may output signals representative of time-varying pressure fluctuations detected in the air flow. The sensor output may be conveyed wirelessly or via a wired connection 206 to the computing device for advanced detection of wake or clear-air turbulence during takeoff, flight, approach, and/or landing.

Figure 3A:
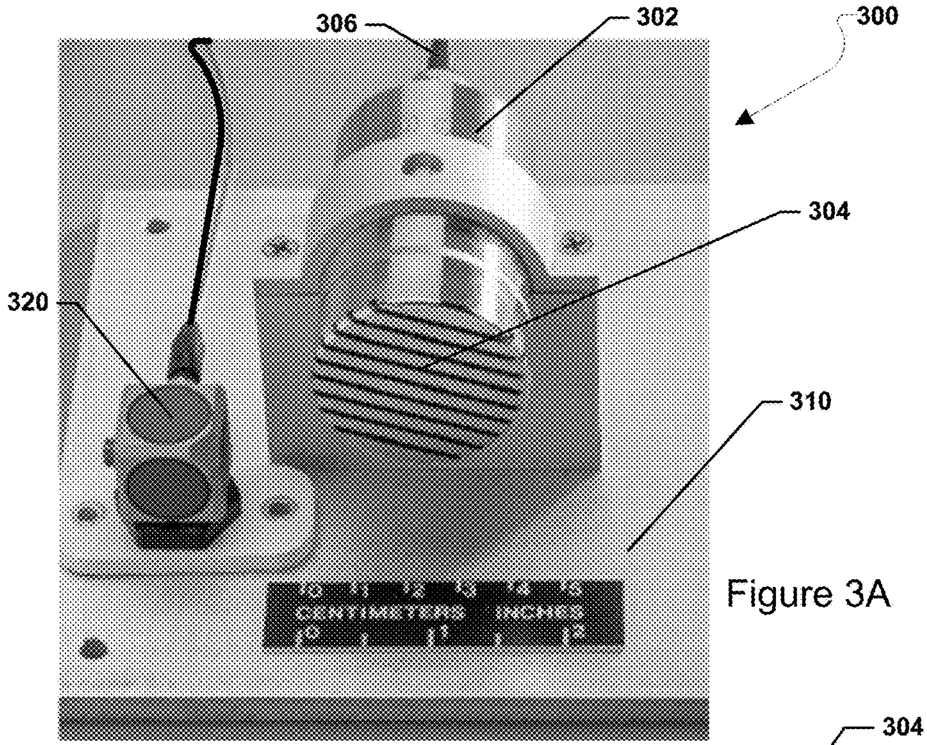
FIGS. 3A and 3B are diagrams illustrating front and side views of an infrasonic sensor configured for mounting to an interior or exterior surface of an aircraft according to some embodiments.
Figure 3B:
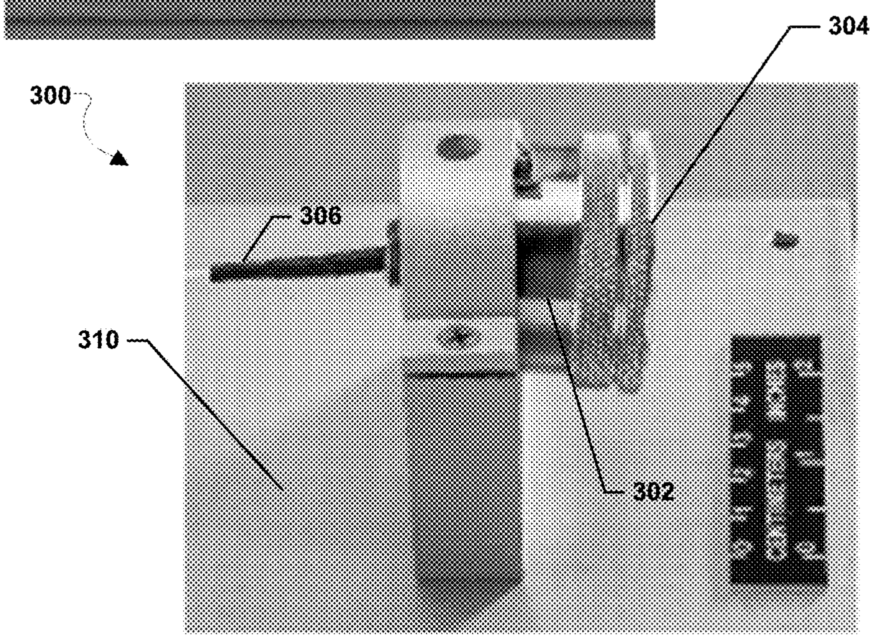

FIGS. 3A and 3B is a diagram illustrating front and side views of an infrasonic sensor 300 configured for mounting to an interior or exterior surface of an aircraft 100 according to some embodiments. As shown, the infrasonic sensor 300 may include a sensor body 302 and a sensor face 304 defined at one end of the sensor body 302.

In some embodiments, the sensor body 300 may contain sensor components (not shown) that are configured to passively detect infrasound that propagates through the sensor face 304. For example, the sensor components may be configured to detect pressure fluctuations produced by wake vortices in the range of 0.1 to 100 Hz and/or pressure fluctuations produced by clear air turbulence in the range of 0.1 to 10 Hz. Embodiments of the infrasonic sensor 300 may configured to detect the infrasound associated with wake turbulence, clear air turbulence, or both as described in U.S. Pat. No. 8,401,217, the entire contents of which are incorporated herein by reference.

In some embodiments, the sensor 300 may be mounted to an interior surface (e.g., support frame of an cockpit instrument panel) or an exterior surface of the aircraft 100 (e.g. nose, wing, tail, etc.) using a mounting platform 310. In some embodiments, the mounting platform 310 may be a fixed structure having a shape configured to attach the sensor 300 in place to the target interior or exterior surface.

In some embodiments, the sensor 300 may be mounted to an interior or exterior surface of the aircraft 100 using a closed cell polyurethane foam. In some embodiments, the closed cell polyurethane foam may be formed around at least a portion of the infrasonic sensor to form a windshield that reduces, if not eliminates, wind noise. In some embodiments, to reduce background noise further, the polyurethane form may be used in front of the infrasonic sensor 300 so that higher frequency or audible signals may be reduced, if not eliminated. For example, if an infrasonic sensor 300 is installed in the cockpit of the aircraft 100, audible noise that may be detected by the sensor (e.g., signals above 20 Hz) may be eliminated, if not reduced, by using an infrasonic windshield. In some embodiments, the closed cell polyurethane foam may be additionally formed to have an aerodynamic shape as described in U.S. Pat. No. 8,671,763, the entire contents of which are incorporated herein by reference.

In some embodiments, the infrasonic sensor 300 may output time-varying signals representative of infrasound propagating through the air to a computing device that implements data acquisition and air turbulence detection. For example, in some embodiments, the sensor 300 may output signals representative of time-varying pressure fluctuations detected in the air flow. The sensor output may be conveyed wirelessly or via a wired connection 306 to the computing device for advanced detection of wake or clear air turbulence during takeoff, flight, approach, and/or landing.

Vibrations may be introduced into the infrasonic signals during takeoff, landing, at flight altitude or on the taxi runway. In some embodiments, these vibratory signals may be reduced, if not eliminated, by adjusting the microphone diaphragm (not shown) of the infrasonic sensors (e.g., 200 and 300) so that all vibrations are above 20 Hz. In some embodiments, vibrations in the infrasonic signals may also be reduced by using 3-axis accelerometers (e.g., 320) that may be used to compensate for and/or remove such vibrations from the received infrasonic signals.

Figure 4:
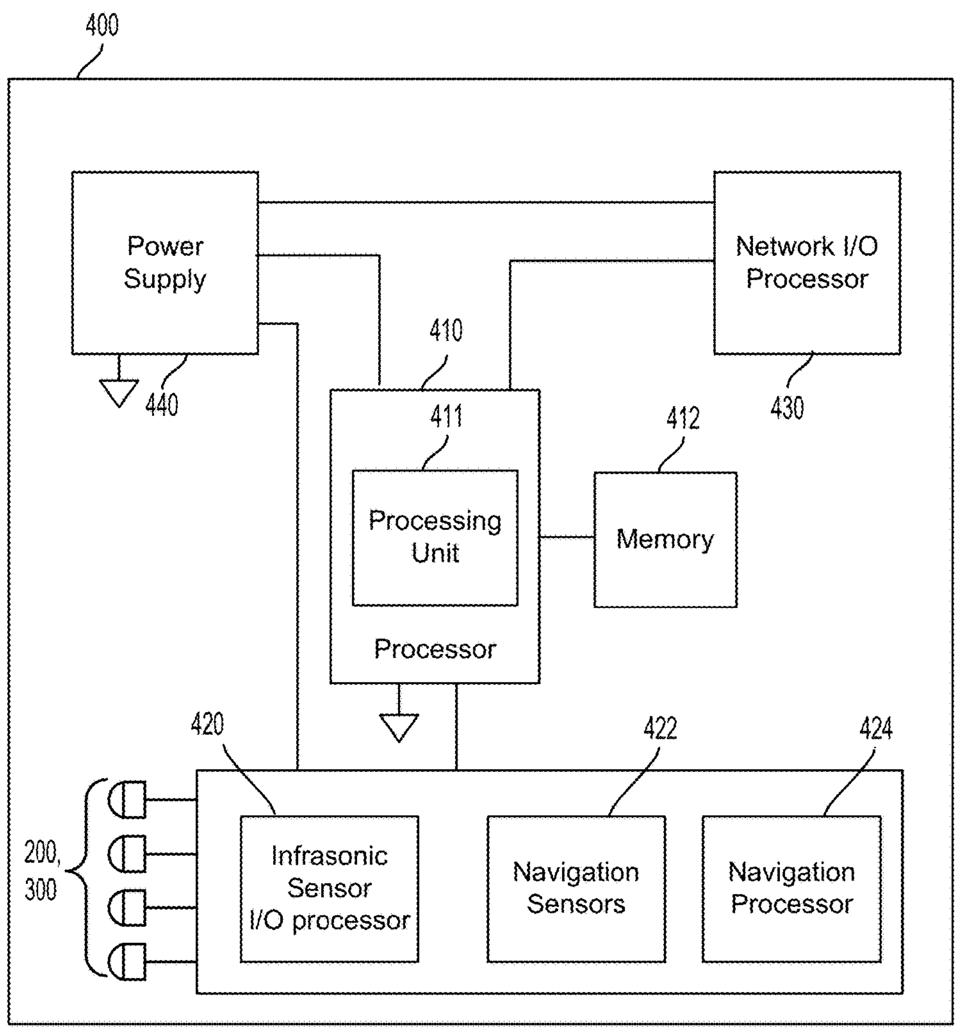
FIG. 4 is a diagram illustrating components of a computing device configured to implement an onboard air turbulence avoidance system according to some embodiments.

FIG. 4 is a diagram illustrating components of a computing device 400 configured to implement an onboard passive system for air turbulence avoidance according to some embodiments. With reference to FIGS. 1-4, the computing device 400 may include various circuits and devices used to power and control the operations of the data acquisition and advanced air turbulence detection. The computing device 400 may include a processor 410, memory 412, an infrasonic sensor input/output (I/O) processor 420, one or more navigation sensors 422, a navigation processor 424, a network I/O processor 430, and a power supply 440. The infrasonic sensor input/output (I/O) processor 520 may be coupled to one or more infrasonic sensors 200 and/or 300.

In some embodiments, the processor 410 may be dedicated hardware specifically adapted to implement a method of passively detecting air turbulence at remote distances using one or more infrasonic sensors 200, 300 mounted to an aircraft according to some embodiments. In some embodiments, the processor 410 may also control other operations of the aircraft. In some embodiments, the processor 410 may be or include a programmable processing unit 411 that may be programmed with processor-executable instructions to perform operations of the various embodiments. In some embodiments, the processor 410 may be a programmable microprocessor, microcomputer or multiple processor chip or chips that can be configured by software instructions to perform a variety of functions of the vehicle. In some embodiments, the processor 410 may be a combination of dedicated hardware and a programmable processing unit 411.

In some embodiments, the memory 412 may store processor-executable instructions and/or outputs from the infrasonic sensor I/O processor 420, the one or more navigation sensors 422, navigation processor 424, or a combination thereof. In some embodiments, the memory 412 may be volatile memory, non-volatile memory (e.g., flash memory), or a combination thereof. In some embodiments, the memory 412 may include internal memory included in the processor 410, memory external to the processor 410, or a combination thereof.

In some embodiments, the processor 410 may be configured to receive and process the respective output data from the infrasonic sensors mounted to the aircraft (e.g., 200, 300). In some embodiments, the processor 410 may be configured to receive the output data directly from the infrasonic sensor I/O processor 420, which may be coupled to the infrasonic sensors 200, 300. In some embodiments, the processor 410 may access the output data from the infrasonic sensors 200, 300 via the memory 412. In some embodiments, the processor 410 may be configured to process the output data from the infrasonic sensors 200, 300 to detect wake turbulence, clear air turbulence, mountain waves, severe weather including tornadoes, and man-made turbulence events, such as a rocket launch.

In some embodiments, the processor 410 may be further coupled to the one or more navigation sensors 422, the navigation processor 424, or a combination thereof. In some embodiments, the processor 410 may be configured to receive navigational data from the one or more navigation sensors 422 and/or the navigation processor 424. The processor 410 may be configured to use such data in order to determine the vehicle's present position, orientation, speed, velocity, direction of travel, or any combination thereof, as well as the appropriate course towards a desired destination. The one or more navigation sensors 422 may include one or more gyroscopes (typically at least three), a gyrocompass, one or more accelerators, location sensors, or other types of sensors useful in detecting and controlling the attitude and movements of the vehicle. Location sensors coupled to the navigation processor 424 may include a global navigation satellite system (GNSS) receiver (e.g., one or more Global Positioning System (GPS) receivers) enabling the aircraft (e.g., 100) to determine the aircraft's coordinates, altitude, direction of travel and speed using GNSS signals. Alternatively or in addition, the navigation processor 424 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network base stations, radio stations, remote computing devices, other UAVs, etc. In some embodiments in which the vehicle is a UAV (e.g., 200), the one or more navigation sensors 422 may provide attitude information including vehicle pitch, roll, and yaw values. In some embodiments, the self-contained avionics sensing and flight control system for small, unmanned aerial vehicle as described in U.S. Pat. No. 7,962,252, the entire contents of which are incorporated by reference herein, may be configured in the vehicle.

In some embodiments, the processor 410 may transmit a signal (e.g., a turbulence warning signal) to the one or more navigation sensors 422 and/or the navigation processor 424 in response to detecting wake and/or clear air turbulence from the output of the infrasonic sensors 200, 300. For example, in some embodiments, the navigation sensor and/or processors may be configured to re-route a flight path of the aircraft (e.g., a UAV) to avoid the detected turbulence in response to receiving a turbulence warning signal from the processor 410.

In some embodiments, the processor 410 may be coupled to the network I/O processor 430 in order to communicate with a remote computing device (not shown) over a wired or wireless communication link. For example, in some embodiments, the network I/O processor 430 to transmit a signal (e.g., a turbulence warning signal) to a speaker, display or other output device to warn a pilot in advance of the detected air turbulence. In some embodiments, the network I/O processor 430 is a radio frequency (RF) I/O processor. In some embodiments, the network I/O processor 430 may be a transmit-only or a two-way transceiver processor. For example, the network I/O processor 430 may include a single transceiver chip or a combination of multiple transceiver chips for transmitting and/or receiving signals. The network I/O processor 430 may operate in one or more of a number of network communication protocols or radio frequency bands depending on the supported type of communications.

The remote computing device may be any of a variety of computing devices, including but not limited to a processor in cellular telephones, smart-phones, web-pads, tablet computers, Internet enabled cellular telephones, wireless local area network (WLAN) enabled electronic devices, laptop computers, personal computers, and similar electronic devices equipped with at least a processor and a communication resource to communicate with the network I/O processor 430.

In some embodiments, the processor 410, the memory 412, the infrasonic sensor I/O processor 420, the one or more navigation sensors 422, the navigation processor 424, the network I/O processor 430, and any other electronic components of the computing device 400 may be powered by the power supply 440. In some embodiments, the power supply 440 may be a battery, a solar cell, or other type of energy harvesting power supply.

While the various components of the computing device 400 are illustrated in FIG. 4 as separate components, some or all of the components may be integrated together in a single device or module, such as a system-on-chip module.

Figure 5:
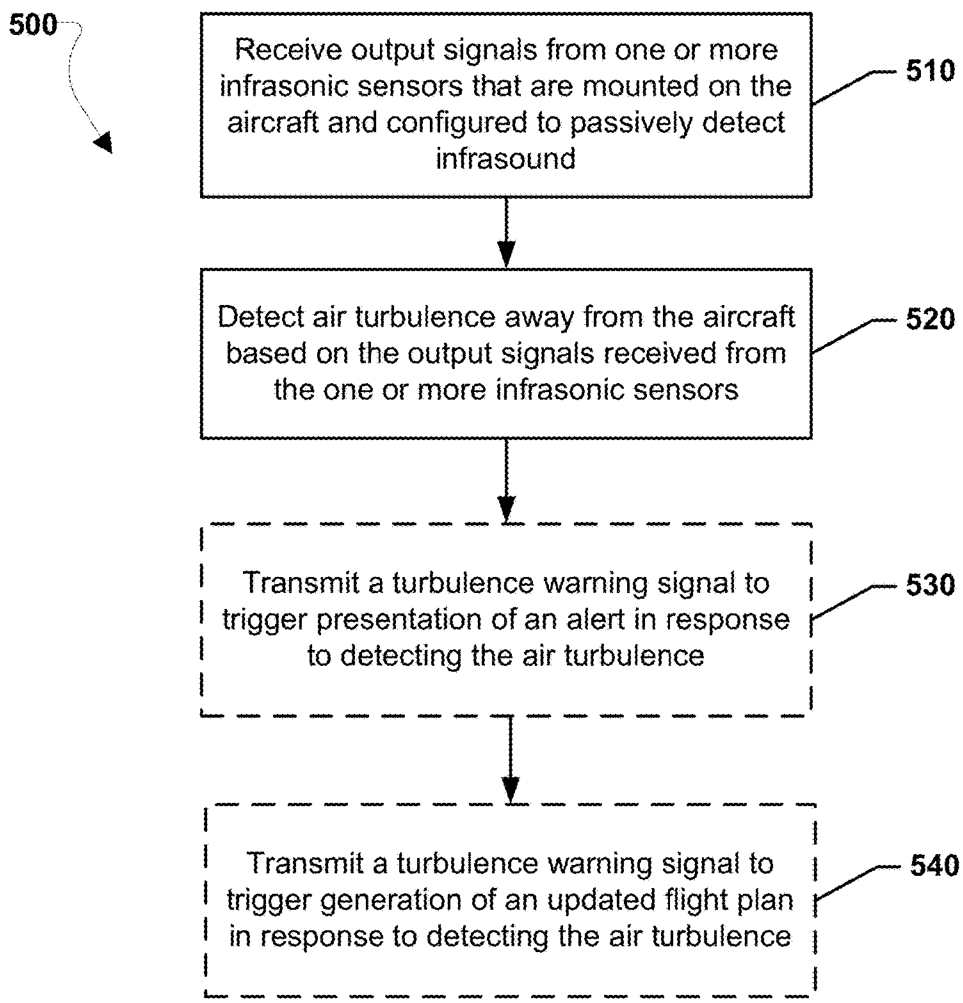
FIG. 5 is a diagram illustrating a method of passively detecting air turbulence using infrasonic sensors mounted on an aircraft according to some embodiments.

FIG. 5 is a diagram illustrating a method 500 of passively detecting air turbulence using infrasonic sensors mounted on an aircraft according to some embodiments. With reference to FIGS. 1-5, operations of the method 500 may be performed by a processor (e.g., 410) of a computing device 400 configured to implement an onboard passive system for air turbulence avoidance according to some embodiments.

In block 510, the processor (e.g., 410) may receive output signals from one or more infrasonic sensors (e.g., 200, 300) that are mounted on the aircraft and configured to passively detect infrasound. For example, in some embodiments, the processor may receive time-varying signals that represent pressure fluctuations associated with infrasound generated by the air turbulence away from the aircraft.

In block 520, the processor (e.g., 410) may detect air turbulence away from the aircraft based on the output signals received from the one or more infrasonic sensors (e.g., 200, 300). In some embodiments, the processor may detect wake turbulence at a distance away from the aircraft that is associated with the takeoff, landing, and/or approach of one or more other aircrafts in or about an airport. In some embodiments, the processor may detect clear air turbulence at a distance away from the aircraft.

In optional block 530, the processor (e.g., 410) may transmit a turbulence warning signal to trigger presentation of an alert in response to detecting the air turbulence. In some embodiments, an output device of a computerized pilot warning system (e.g., display, speaker, etc.) may be commanded to present an audible or visual alert. In some embodiments, the turbulence warning signal may include a location and/or a distance and direction of the detected air turbulence that may be presented to the pilot via the output device. By providing advanced warning of the detected air turbulence away from the aircraft, a pilot of the aircraft may take steps to evade or ameliorate the situation before the aircraft actually experiences the turbulence. For example, in some embodiments, the onboard passive system may directly warn pilots about dangers of wake vortices during takeoff and landing and clear air turbulence at flight altitude.

In optional block 540, the processor (e.g., 410) may transmit a turbulence warning signal to trigger generation of an updated flight plan in response to detecting the air turbulence. In some embodiments, the processor may send the turbulence warning signal to a navigation processor (e.g., 422) of the computing device (e.g., 400) to re-route the aircraft along an updated flight plan that avoids the detected turbulence. In some embodiments, the turbulence warning signal may include a location and/or a distance and direction of the detected air turbulence that may be used by the navigation processor to generate the updated flight plan.

In other embodiments, the onboard passive system may be used to help pilots find the core of a jet stream in which there is little to no turbulence, thereby providing for smoother flight and fuel savings by riding on the jets streams with higher tail wind. In still other embodiments, the onboard passive system may be used to help pilots find thermals where air rises due to heat, thereby lift used by particular aircraft (e.g., gliders). In yet still other embodiments, the onboard passive system may also be used to help find an optimum location for air-borne wind turbines (e.g., a wind turbine with a rotor supported in the air without a tower). Air-borne wind turbines may operate in low or high altitude for generating energy.

Figure 6:
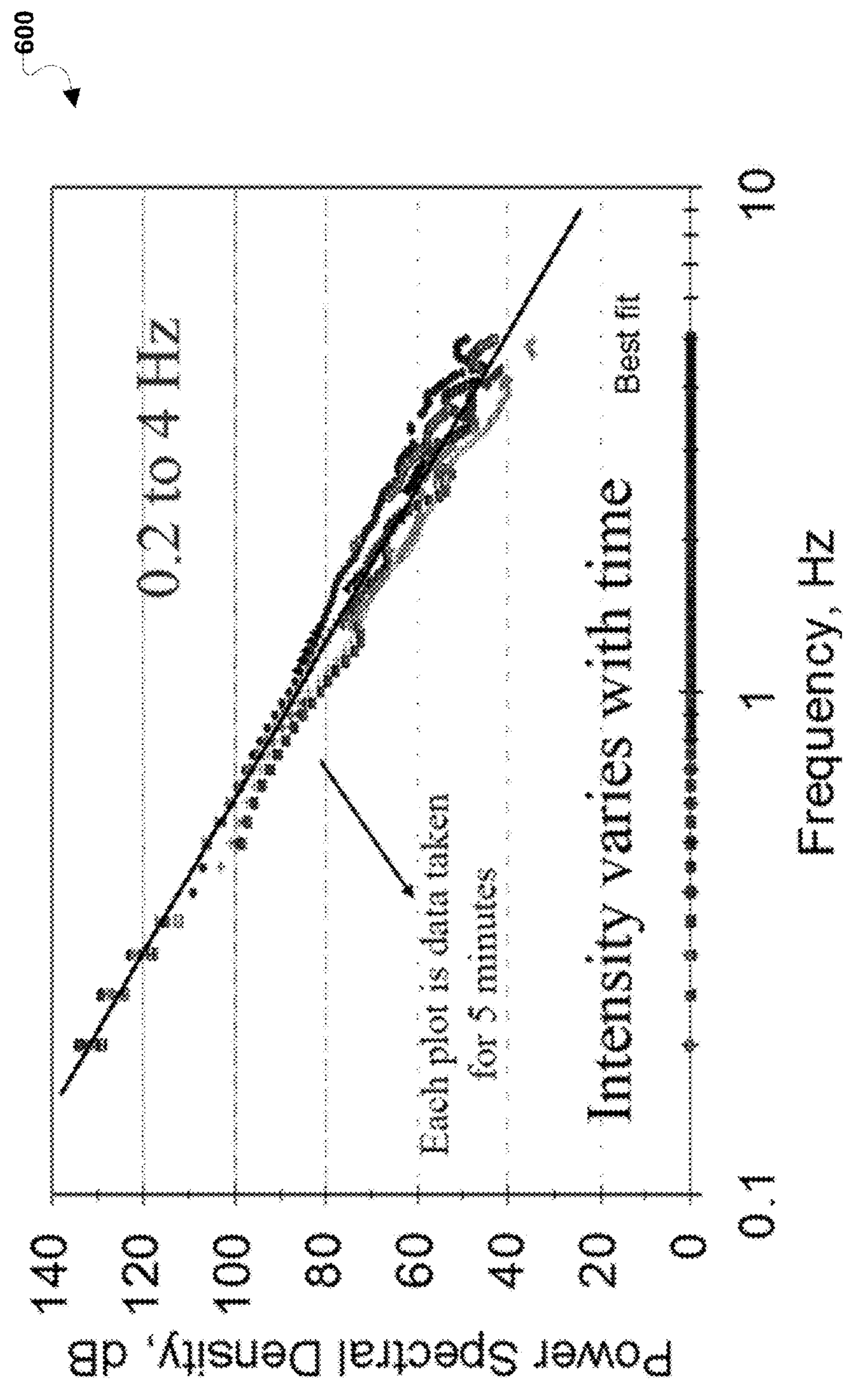
FIG. 6 is a diagram illustrating an infrasonic emission signature characteristic of clear air turbulence detected using an infrasonic sensor array according to some embodiments.

As discussed above, the processor of an onboard passive air turbulence avoidance system may be configured to detect air turbulence away from the aircraft based on the infrasonic signals received from the infrasonic sensors mounted to the aircraft (e.g., 200, 300). For example, FIG. 6 is a diagram illustrating an infrasonic emission signature 600 characteristic of clear air turbulence detected using an infrasonic sensor array according to some embodiments. As shown in the frequency domain, the infrasonic signals characteristic of clear air turbulence may exhibit a time-varying intensity (e.g. power spectral density, dB) with high coherence amongst the sensors in the frequency range of 0.2 To 4 Hz. In some embodiments, the power spectral density measurements characteristic of clear air turbulence may be fit to a power law: $J=Cf^n$ where J is the power spectral density (PSD) in the $Pa^2/Hz$, C is a constant, f is the frequency, and n is the power law exponent. In some embodiments, the best fitted exponent n for the power law J may be a value in an inclusive range between −6 to 7, which is characteristic of infrasonic emissions from clear air turbulence. The frequency bandwidth for clear air turbulence is typically in the range between 0.1 to 10 Hz.

Figure 7:
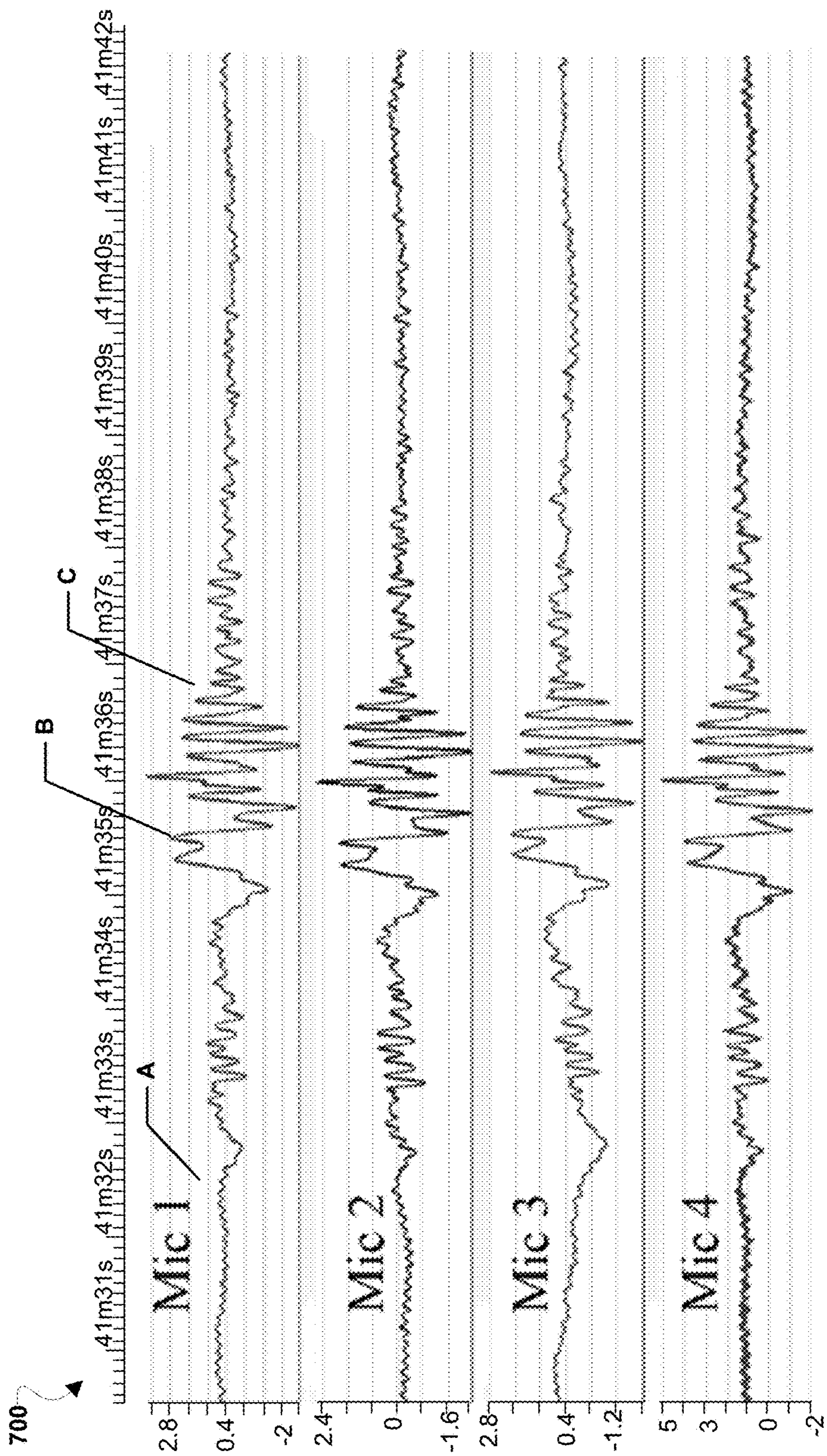
FIG. 7 is a diagram illustrating exemplary time varying signals characteristic of wake vortices output by multiple infrasonic sensors according to some embodiments.

FIG. 7 is a diagram illustrating exemplary time varying signals 700 characteristic of wake vortices output by multiple infrasonic sensors (e.g., Mic1, Mic2, Mic3, and Mic4) according to some embodiments. For example, as shown, Region A represents the time when another aircraft is accelerating on the ground. In Region A, the associated infrasonic pressure fluctuations of the wake vortices start to build, but are not yet that strong. Region B represents a pressure burst generated by the other aircraft taking off. In Region B, the strength of the pressure burst in Region B may overwhelm the low-frequency emissions from the wake vortices shed from the aircraft. Region C represents the pressure fluctuations associated with a trail of wake vortices produced by the other aircraft after it is airborne. In the absence of the pressure burst, the low-frequency emissions of the wake turbulence may be detectable for time spans as long as 2-3 minutes in Regions A and C. For example, as shown in Region C, each of the infrasonic sensors initially detect strong wake vortices after the pressure burst that eventually dissipate. The strength of the detected wake vortices may depend on the size of the aircraft, such that heavier aircraft having stronger and longer vortices than lighter aircraft. In some embodiments, wake vortex avoidance method as described in U.S. Pat. No. 9,620,025, the entire contents of which are incorporated herein by reference, may be implemented to avoid the wake vortex.

Figure 8:
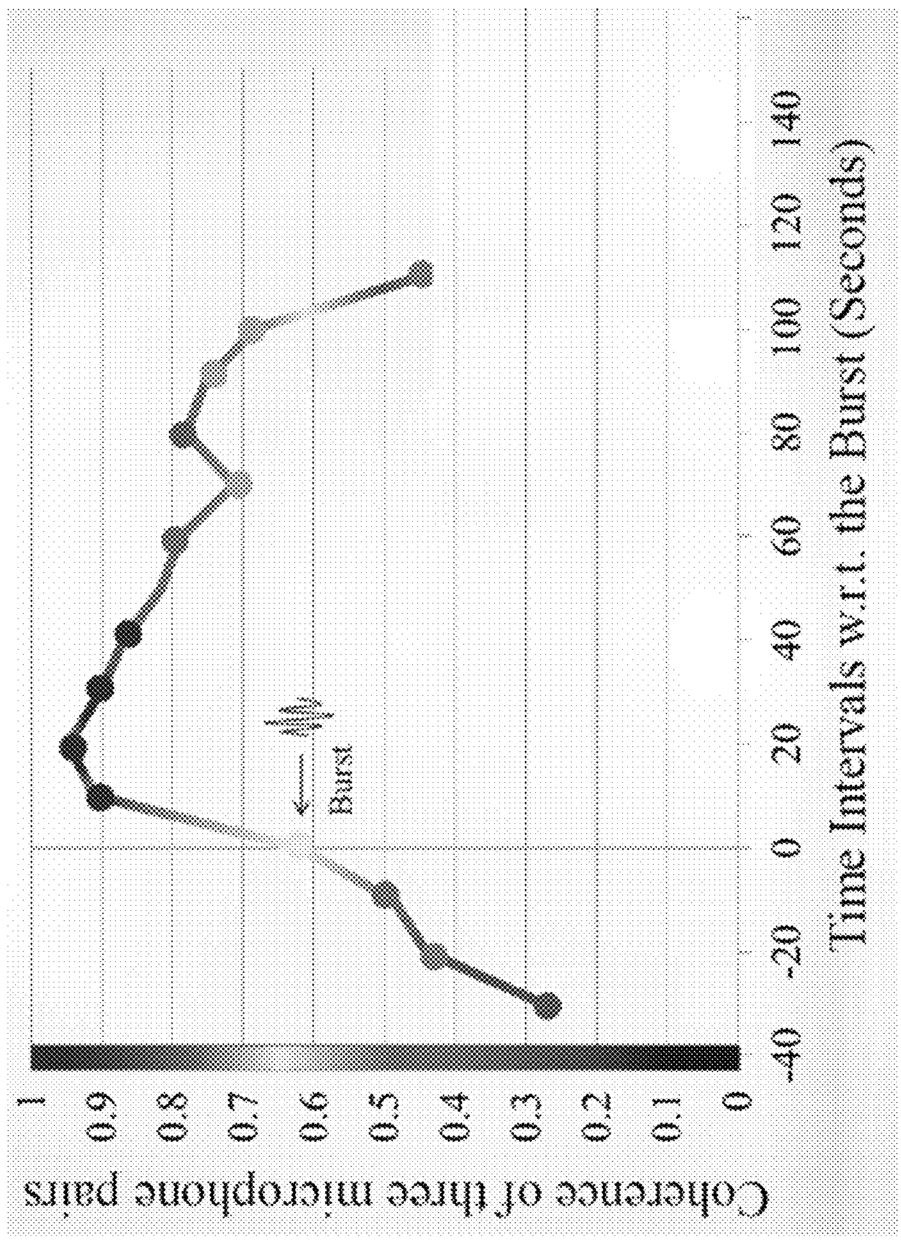
FIG. 8 is a diagram illustrating an infrasonic emission signature characteristic of wake vortices detected using an infrasonic sensor array according to some embodiments.

Based on such sensor output, a processor of an onboard passive air turbulence avoidance system may generate a representative infrasonic emission signature of the wake vortices. FIG. 8 is a diagram illustrating an infrasonic emission signature 800 characteristic of wake vortices detected using an infrasonic sensor array according to some embodiments. For example, in some embodiments, a wake vortex may be detected based on the coherence of the sensor output from the infrasonic sensor array. In this example, the infrasonic signature is represented based on the time-varying coherence of three infrasonic microphone pairs. As shown, the sensor outputs exhibit low coherence prior to takeoff (i.e., pressure burst in Region B of FIG. 7). After takeoff, the sensor outputs may exhibit high coherence, which is indicative of the strong infrasonic emissions associated with the wake vortices. As time passes, the coherence of the sensor outputs decreases as the wake vortices on the runway dissipate. The infrasonic emission signature of wake vortices shed by aircraft typically depends upon the weight of the aircraft. For example, heavier aircraft generally produce stronger wake vortices in lower infrasonic bandwidths. Conversely, lighter aircraft generally produce weaker wake vortices in high infrasonic bandwidth, e.g., up to 100 Hz.

Figure 9:
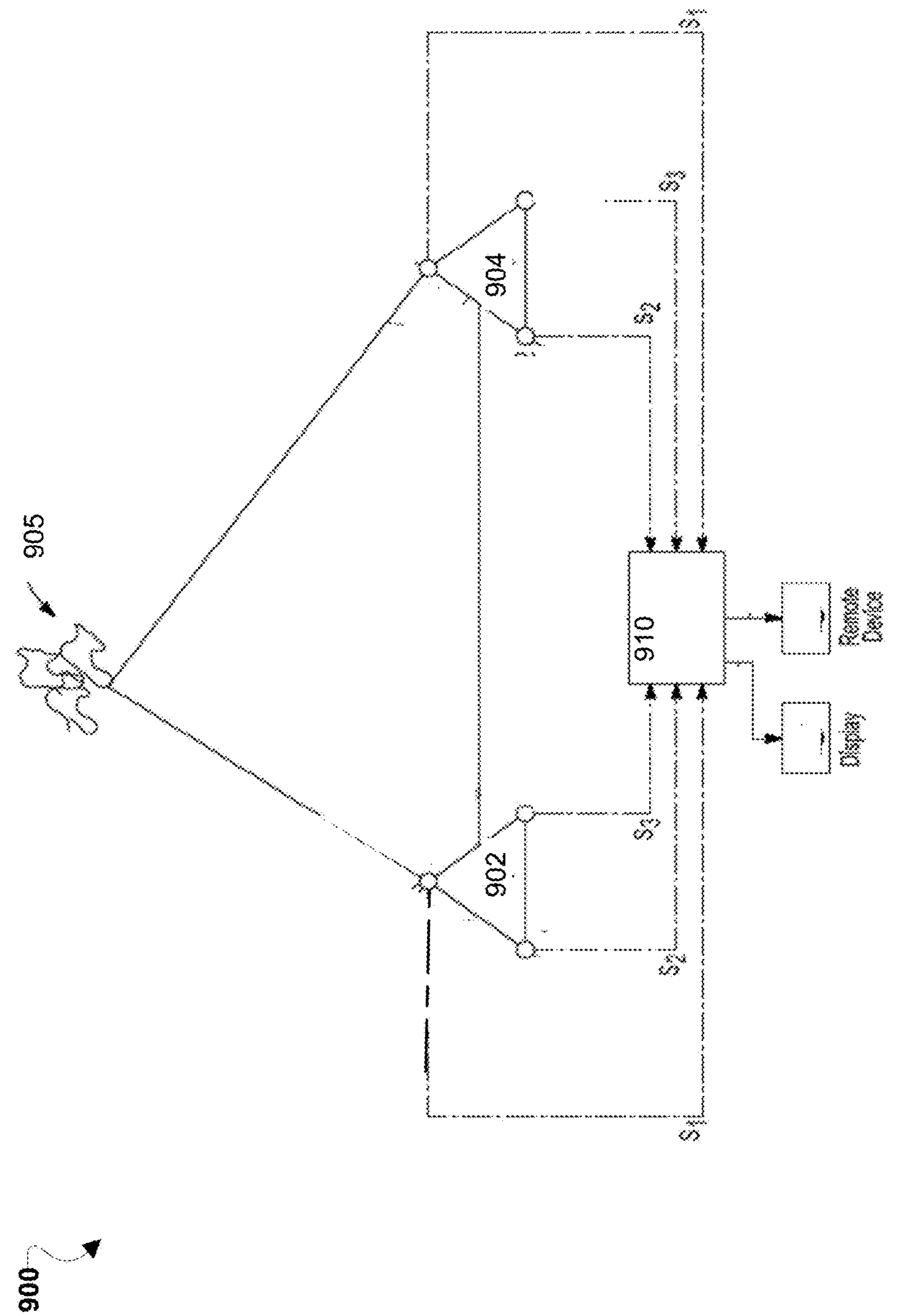
FIG. 9 is a diagram that illustrates a system for determining the distance and direction of clear air turbulence and wake vortices according to some embodiments.

FIG. 9 is a diagram that illustrates a system 900 for determining the distance and direction of clear air turbulence and wake vortices according to some embodiments. For example, in some embodiments, the distance, altitude, and/or azimuthal angle of air turbulence may be determined based on the outputs $S_1$, $S_2$, $S_3$ of respective infrasonic sensor arrays 902, 904 mounted on two or more different aircraft. In some embodiments, the output signals of the respective infrasonic sensor arrays may be transmitted to a ground station 901, which processes the signals to determine the location of the detected turbulence 905. The output signals of the respective infrasonic sensor arrays 902, 904 may be synchronized (or locked-in) using a locked-in amplifier and the GPS location of the respective aircraft. In some embodiments, the ground station 110 may transmit information identifying the type of turbulence (e.g., clear air or wake vortices) along with the corresponding location information (e.g., distance, altitude, and/or azimuthal angle). In some embodiments, differences in the amplitude, phase and frequency in the reception of the output signals may be used to determine the location of the air turbulence.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then,"

"next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a two or more microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. An onboard air turbulence avoidance system for an aircraft comprising:
- two or more infrasonic sensors mounted on the aircraft and configured to passively detect infrasound, wherein the two or more infrasonic sensors comprise, at least:
- an interior infrasonic sensor mounted to a structure in an interior portion of the aircraft wherein the interior portion of the aircraft comprises a cockpit and having a closed cell polyurethane foam windshield mounted over a sensor face of the interior infrasonic sensor; and
- an exterior infrasonic sensor mounted in an external portion of the aircraft; and
- a processor configured with processor-executable instructions to:
  - receive output signals from both the interior infrasonic sensor and the exterior infrasonic sensor.

2. The system of claim 1, wherein the output signals from both the interior infrasonic sensor and exterior infrasonic sensor comprise time-varying signals that represent pressure fluctuations associated with infrasound generated by the air turbulence away from the aircraft.

3. The system of claim 1, wherein the exterior infrasonic sensor is mounted to a pitot tube of the aircraft.

4. The system of claim 1, wherein the closed cell polyurethane foam windshield is configured to eliminate signals about 20 Hertz.

5. The system of claim 1, wherein the air turbulence comprises one or more of clear air turbulence and wake vortices.

6. The system of claim 1, wherein the aircraft comprises an airplane, an unmanned aerial vehicle, or a helicopter.

7. The system of claim 1, wherein the processor is further configured with processor-executable instructions to transmit a turbulence warning signal to trigger generation of one or more of a visual or audible pilot alert and an updated flight plan for the aircraft that avoids the detected air turbulence.

8. The system of claim 1, further comprising one or more accelerometers, wherein the processor is further configured with processor-executable instructions to detect air turbulence away from the aircraft based on the output signals received from both the interior infrasonic sensor and the exterior infrasonic sensor and signals received from the one or more accelerometers.

9. A method of passively detecting air turbulence using two or more infrasonic sensors mounted on an aircraft, comprising:
- receiving output signals from both an interior infrasonic sensor configured to passively detect infrasound and an exterior infrasonic sensor, wherein:

the interior infrasonic sensor is mounted to a structure in an interior portion of the aircraft, wherein the interior portion of the aircraft comprises a cockpit and has a closed cell polyurethane foam windshield mounted in front of a sensor face of the infrasonic sensor; and the exterior infrasonic sensor is mounted in an external portion of the aircraft; and detecting air turbulence away from the aircraft based on the output signals received from both the interior infrasonic sensor and the exterior infrasonic sensor.

10. The system of claim 1, further comprising an automated navigation system configured to control a flight path of the aircraft, wherein the processor is further configured with processor-executable instructions to transmit a turbulence warning signal to the automated navigation system thereby causing the automated navigation system to change the flight path of the aircraft.

11. The method of claim 9, wherein the exterior infrasonic sensor is mounted to a pilot tube of the aircraft.

12. The method of claim 11, wherein receiving the output signals from both the interior infrasonic sensor and the exterior infrasonic sensor comprises receiving time-varying signals that represent pressure fluctuations associated with infrasound generated by the air turbulence away from the aircraft.

13. The method of claim 11, wherein the closed cell polyurethane foam windshield is configured to eliminate signals above 20 Hertz.

14. The method of claim 11, wherein the air turbulence comprises one or more of clear air turbulence and wake vortices.

15. The method of claim 11, wherein the aircraft comprises an airplane, an unmanned aerial vehicle, or a helicopter.

16. The method of claim 11, further comprising:

transmitting a turbulence warning signal to trigger generation of one or more of a visual or audible pilot alert and an updated flight plan for the aircraft that avoids the detected air turbulence.

17. The method of claim 11, further comprising detecting air turbulence away from the aircraft based on the output signals received from both the interior infrasonic sensor and the exterior infrasonic sensor and signals from one or more accelerometer.

18. The method of claim 11, further comprising:

transmitting a turbulence warning signal to an automated navigation system of the aircraft to cause the automated navigation system to change a flight path of the aircraft.

* * * * *